(12) United States Patent
Platner et al.

(10) Patent No.: US 6,886,669 B1
(45) Date of Patent: May 3, 2005

(54) METHOD AND DEVICE FOR ACTIVELY SUSPENDING A WHEEL FROM A VEHICLE

(75) Inventors: David K. Platner, Shelby, MI (US); Kurt A. Burmeister, Rochester Hills, MI (US); Ragnar Ledesma, Sterling Heights, MI (US); Steven R. Miller, Clarkston, MI (US); Mark P. Reynolds, Birmingham, MI (US); Monte G. Williams, Royal Oak, MI (US); Thomas Hughes, Goostrey Near Crewe (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 186 days.

(21) Appl. No.: 09/419,136

(22) Filed: Oct. 15, 1999

(51) Int. Cl.⁷ ............................................. F16F 15/03
(52) U.S. Cl. ............................. 188/267.1; 188/267.2; 280/5.5
(58) Field of Search ........................... 188/267.1, 267.2; 267/140.14, 140.15; 280/5.5, 5.515, 5.514, 124.101, 124.1

(56) References Cited

U.S. PATENT DOCUMENTS

| | | | |
|---|---|---|---|
| 4,869,476 A | * | 9/1989 | Shtarkman ................ 267/140.1 |
| 4,942,947 A | * | 7/1990 | Shtarkman .................. 188/267 |
| 5,259,487 A | | 11/1993 | Petek |
| 5,291,967 A | | 3/1994 | Aoki |
| 5,390,949 A | * | 2/1995 | Naganathan et al. ........ 280/707 |
| 5,413,316 A | | 5/1995 | Easter |
| 5,511,817 A | | 4/1996 | Kasahara et al. |
| 5,547,049 A | * | 8/1996 | Weiss et al. ................. 188/267 |
| 5,556,083 A | * | 9/1996 | Furihata et al. ............. 267/277 |
| 5,590,746 A | * | 1/1997 | Brotz .......................... 188/267 |
| 5,810,126 A | * | 9/1998 | Kordonsky et al. ......... 188/267 |
| 6,029,783 A | * | 2/2000 | Wirthlin ................... 188/267.1 |
| 6,068,249 A | * | 5/2000 | Shtarkman ............... 267/140.1 |

FOREIGN PATENT DOCUMENTS

| | | | |
|---|---|---|---|
| DE | 759423 | | 10/1956 |
| DE | 984268 | | 2/1965 |
| DE | 3902605 | * | 8/1990 |

* cited by examiner

Primary Examiner—Douglas C. Butler
Assistant Examiner—Bradley King
(74) Attorney, Agent, or Firm—Carlson, Gaskey & Olds

(57) ABSTRACT

A method and device for suspending a wheel axle from a vehicle includes a unitary flexible member coupled between the vehicle and the wheel axle and to an electronic control unit. The flexible member is formed of a material that changes shape in the presence of electrical signals having a varying signal strength. The electronic control unit, upon receiving various suspension related inputs, transmits the electrical signals having the varying signal strength to the unitary flexible member to change the shape thereof in order to vary the stiffness of the flexible member and thus control the suspension of the vehicle.

9 Claims, 2 Drawing Sheets

METHOD AND DEVICE FOR ACTIVELY SUSPENDING A WHEEL FROM A VEHICLE

BACKGROUND OF THE INVENTION

The invention relates to methods and devices for actively suspending a wheel from a vehicle.

The suspension of a vehicle allows it to drive smoothly over a bumpy road. The wheels may jolt up and down, but springs between the wheel axles and the body of the car flex and take up the force of the jolts. This ensures that the force of the bumping is not transferred to the vehicle. Springs alone produce a bouncing motion, so the suspension also contains dampers, commonly known as shock absorbers. These slow the movement of the springs to prevent the vehicle and its occupants bouncing up and down.

Thus, the suspension system of a vehicle typically requires two components for each wheel, i.e., a spring and a damper. It is desirable, however, to combine the two components into a single component in order to reduce cost and simplify manufacturing.

SUMMARY OF THE INVENTION

A method and device for suspending a wheel from a vehicle includes a unitary flexible member coupled between the vehicle and the wheel and to an electronic control unit. The flexible member is formed of a material that changes shape in the presence of electrical signals having a varying signal strength. The electronic control unit, upon receiving various suspension related inputs, transmits the electrical signals having the varying signal strength to the unitary flexible member to change its shape in order to vary the stiffness of the flexible member and thus control the suspension of the vehicle. Essentially, the mesh expands and contracts to vary stiffness.

In one embodiment, the flexible member is an interwoven mesh diaphragm having at least four edges, with one edge coupled to the wheel and another edge coupled to the vehicle. The mesh changes shape in a parallelogram fashion in response to the varying electrical signals being applied to at least two edges of the mesh. The diaphragm further includes a plurality of interwoven members intersecting at a plurality of intersecting points so that the mesh changes shape in response to the varying electrical signals being applied to the two edges of the mesh and a plurality of the interconnecting points. The interwoven members may be comprised of flexible tubes having an electrically responsive fluid contained therein, or flexible membranes comprised of an electrically responsive material.

In an alternative embodiment, the flexible member is an elastomeric member containing an electrically responsive gel-like substance therein, wherein the gel changes shape in response to the varying electrical signals. The elastomeric member further includes two opposing end plates, one end plate being coupled to the vehicle and the other end plate being coupled to the wheel, wherein the electronic control unit, in controlling the shape of the gel, is further operative to transmit the varying electrical signals to at least one of the end plates in order to pass the varying electrical signals through the gel.

These and other features of the present invention can be understood from the following specification and drawings.

DETAILED DESCRIPTION OF A PREFERRED EMBODIMENT

Figure 1:
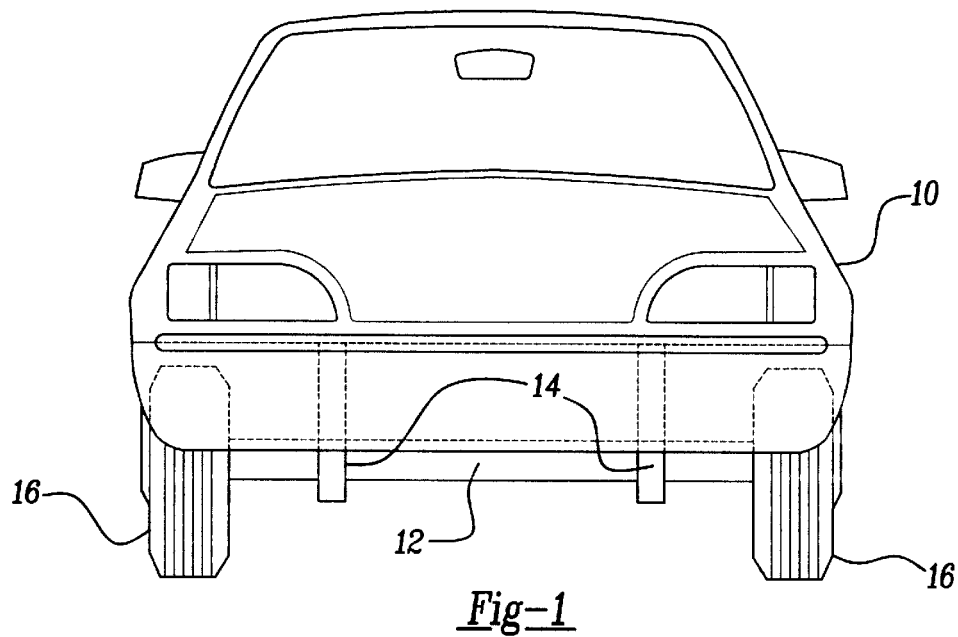
FIG. 1 is a schematic plan view of a vehicle suspension suitable for the method and system of the present invention.

FIG. 1 shows a schematic plan view of a typical vehicle suspension system suitable for the method and device of the present invention. The suspension system typically includes a vehicle frame 10 coupled to a rigid axle 12 via suspension elements 14. The axle 12 is coupled to a pair of wheels 16 and move the wheels 16 in an up and down fashion according to the movement of the suspension elements 14.

Figure 2:
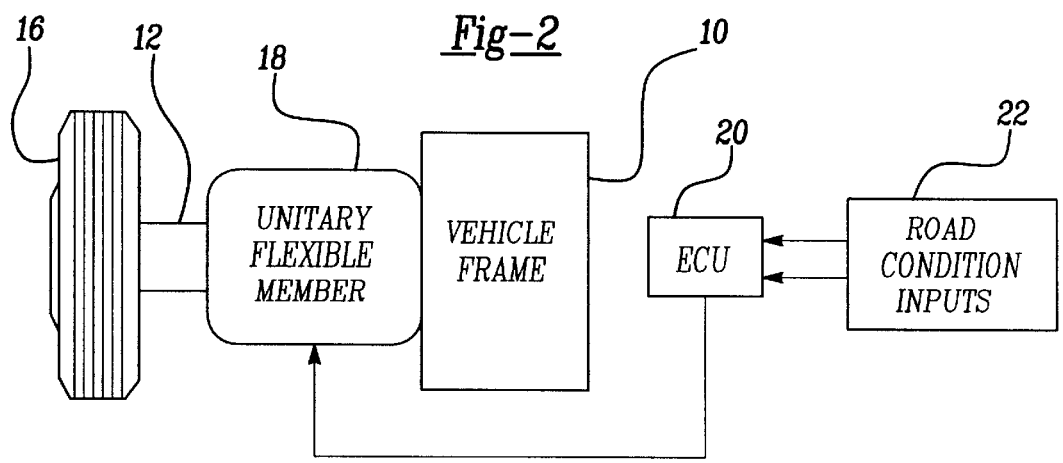
FIG. 2 is a schematic diagram of the system of the present invention.

FIG. 2 is a schematic diagram illustrating the device of the present invention incorporated into a vehicle suspension system. The device is a unitary flexible member 18 that is formed of a material that changes shape in the presence of electrical signals of varying strength thereby varying the stiffness of the flexible member 18 and, thus, the stiffness of the vehicle's suspension. Essentially, the mesh expands or contracts to change the stiffness. To accomplish this, the flexible member 18 is coupled to an electronic control unit ("ECU") 20 having control logic programmed therein that generates the varying electrical signals. ECU 20 generates the electrical signals based on input signals 22 indicative of the road condition traveled by, or to be traveled by, the vehicle. For example, the input signals may include the steering angle of the vehicle, the speed of the vehicle, the stroke of the wheels 16 relative to the vehicle frame 10, and the vertical acceleration acting on the frame 10 of the vehicle. The number and type of input signals 22 to be used with the present invention is not limited to those discussed above.

Figure 3:
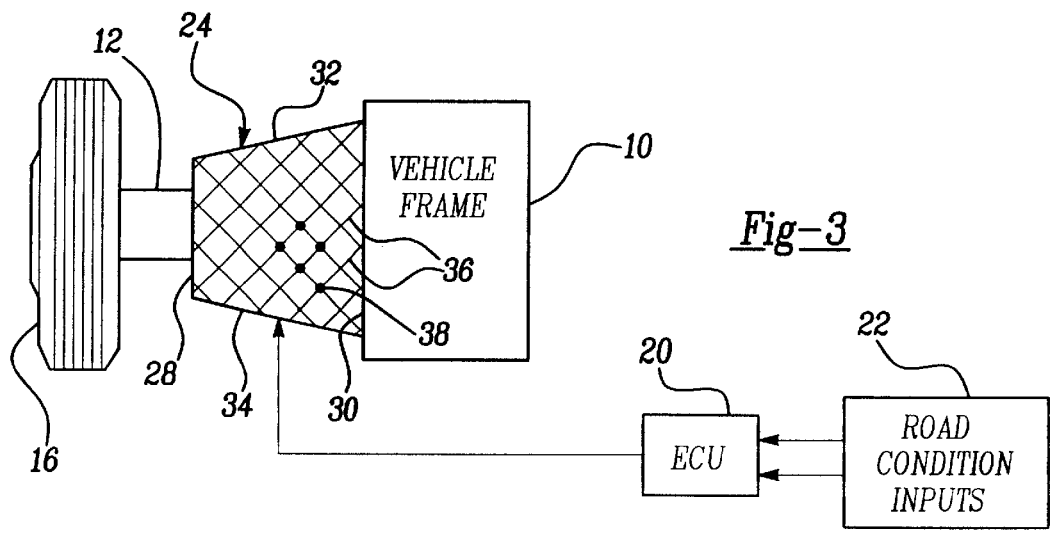
FIG. 3 is a schematic diagram of a first embodiment of the device of the present invention.

In a first embodiment, the flexible member 18 is a mesh diaphragm as shown in FIG. 3. The mesh diaphragm 24 is preferably a flat, rectangular-shaped member having at least four edges, wherein one edge 28 is coupled to the wheel 16 via the axle 12 and a second edge 30 is coupled to the vehicle frame 10. The remaining edges 32, 34 connect the first edge 28 with the second edge 30. The mesh diaphragm 24 changes shape in a parallelogram fashion in response to the varying electrical signals applied thereto by the ECU 20. The electrical signals are preferably applied to at least any two edges 28, 30, 32, 34 of the mesh 24.

Figure 4:
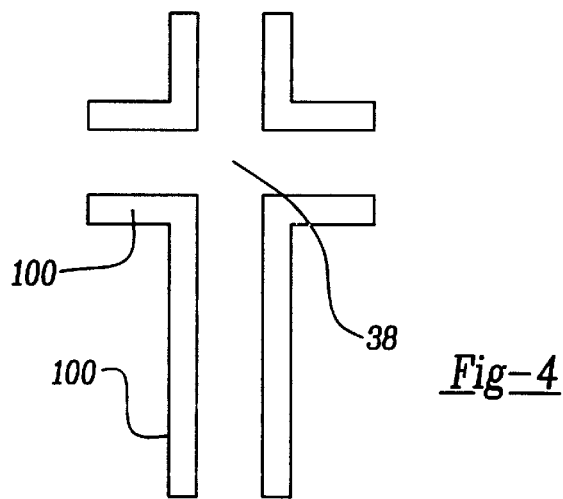
FIG. 4 is a partial cross-sectional view of the mesh diaphram formed of intersecting tubes.

Furthermore, the mesh diaphragm 24 includes a plurality of interwoven members 36 intersecting at a plurality of intersecting points 38. By applying the varying electrical signals to the intersecting points 38, the mesh 24 changes shape even further. The interwoven members 36 may be electrically responsive elastic membranes, flexible tubes having an electrically responsive fluid, such as a rheological fluid, contained therein, or flexible rods comprised of electrically responsive materials, such as piezoelectric, crystalline or rheological materials. Examples of the tubes 100 are shown in FIG. 4.

Figure 5:
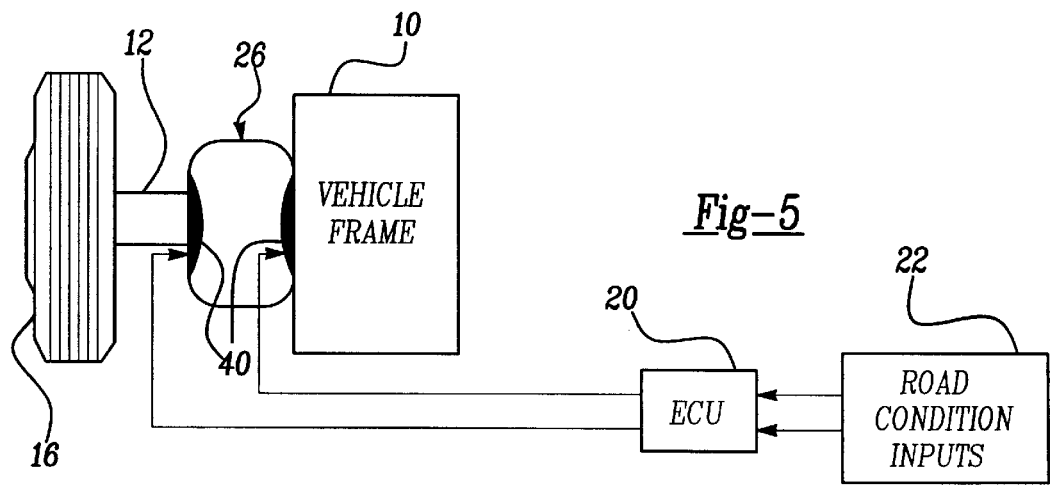
FIG. 5 is a schematic diagram of a second embodiment of the device of the present invention.

FIG. 5 illustrates an alternative embodiment of the flexible member 18. Here, the flexible member is an elastomeric member 26 containing an electrically responsive gel-like substance therein, such as a rheological substance. The gel changes shape in response to the varying electrical signals being applied to the elastomeric member 26. The elastomeric member 26 includes two opposing end plates 40, 42, with one end plate coupled to the vehicle frame 10 and the other end plate coupled to the wheel 16. The ECU 20 transmits the varying electrical signals to at least one of the end plates 40 in order to pass the varying electrical signals through the gel.

Preferred embodiments have been disclosed. However, a worker skilled in this art would recognize that modifications would come within the scope of this invention. Thus, the following claims should be studied to determine the scope and content of this invention.

What is claimed is:

1. A device for suspending a wheel axle from a vehicle having an electronic control unit for receiving suspension-related inputs, the device comprising:

an interwoven mesh diaphragm including a plurality of interwoven members intersecting a plurality of intersecting points, said mesh diaphragm coupled between the vehicle and the wheel axle and to the electronic control unit and formed of a material that changes shape in the presence of electrical signals having a varying signal strength; and wherein the electronic control unit, in response to receiving the suspension related inputs, transmits the electrical signals having the varying signal strength to the interwoven mesh diaphragm to change the shape thereof in order to vary the stiffness of the interwoven mesh diaphragm and thus control the suspension of the vehicle.

2. The device as recited in claim 1 wherein the interwoven mesh diaphragm includes at least four edges, one edge being coupled to the wheel axle and another edge coupled to the vehicle, wherein the mesh changes shape in a parallelogram fashion in response to the varying electrical signals being applied to at least two edges of the mesh.

3. The device as recited in claim 2 wherein the mesh diaphragm changes shape in response to the varying electrical signals being applied to the at least two edges of the mesh diaphragm and the plurality of the intersecting points.

4. The device as recited in claim 3 wherein the interwoven members include flexible tubes having an electrically responsive fluid contained therein.

5. The device as recited in claim 4 wherein the electrically responsive fluid is a rheological fluid.

6. The device as recited in claim 3 wherein the interwoven members include flexible membranes comprised of an electrically responsive material.

7. A device for suspending a wheel axle from a vehicle having an electronic control unit for receiving suspension-related inputs, the device comprising:

an elastomeric member including two opposing end plates and containing an electrically responsive gel, said elastomeric member coupled between the vehicle and the wheel axle and to the electronic control unit wherein the gel changes shape in response to electrical signals having a varying signal strength; and wherein the electronic control unit, in response to receiving the suspension related inputs, transmits the electrical signals having the varying signal strength through at least one of the end plates to change the shape of the gel in order to vary the stiffness of the elastomeric member and thus control the suspension of the vehicle.

8. The device as recited in claim 7 wherein the gel is a rheological substance.

9. The device as recited in claim 7 wherein the two opposing end plates are further defined by one end plate being coupled to the vehicle and the other end plate being coupled to the wheel axle.

* * * * *

UNITED STATES PATENT AND TRADEMARK OFFICE
CERTIFICATE OF CORRECTION

PATENT NO. : 6,886,669 B1
DATED : May 3, 2005
INVENTOR(S) : Platner et al.

It is certified that error appears in the above-identified patent and that said Letters Patent is hereby corrected as shown below:

<u>Title page,</u>
Item [75], Inventors, the residence for "Thomas Hughes" should read as
-- Cheshire (GB) --.

Signed and Sealed this

Sixteenth Day of August, 2005

JON W. DUDAS
*Director of the United States Patent and Trademark Office*